N. C. STOREY.
POWER TRANSMITTING MECHANISM.
APPLICATION FILED SEPT. 27, 1918.

1,401,204.

Patented Dec. 27, 1921.
3 SHEETS—SHEET 1.

WITNESS:

INVENTOR.
Norman C. Storey
BY
Gifford & Bull
ATTORNEY.

UNITED STATES PATENT OFFICE.

NORMAN C. STOREY, OF AGUIRRE, PORTO RICO, WEST INDIES.

POWER-TRANSMITTING MECHANISM.

1,401,204.  Specification of Letters Patent. Patented Dec. 27, 1921.

Application filed September 27, 1918. Serial No. 255,895.

*To all whom it may concern:*

Be it known that I, NORMAN C. STOREY, a citizen of the United States, residing in Aguirre, Porto Rico, West Indies, have invented certain new and useful Improvements in Power-Transmitting Mechanism, of which the following is a specification.

My invention relates to a power-transmitting mechanism and it has for its object an improvement in a device of this character.

One of the objects of my invention is the provision of a power-transmitting mechanism in which the power is transmitted from a driving member to driven members through connections by which the ratio of speed of the driven members to that of the driving member may be independently changed.

Another object of my invention is the provision of a simple and compact construction by which power may be transmitted from a driving member to a driven member, with means for varying the ratio of the speed of the driving member to that of the driven member.

Other objects of my invention will appear in the specification and will be more particularly pointed out in the claims.

Figure 1:
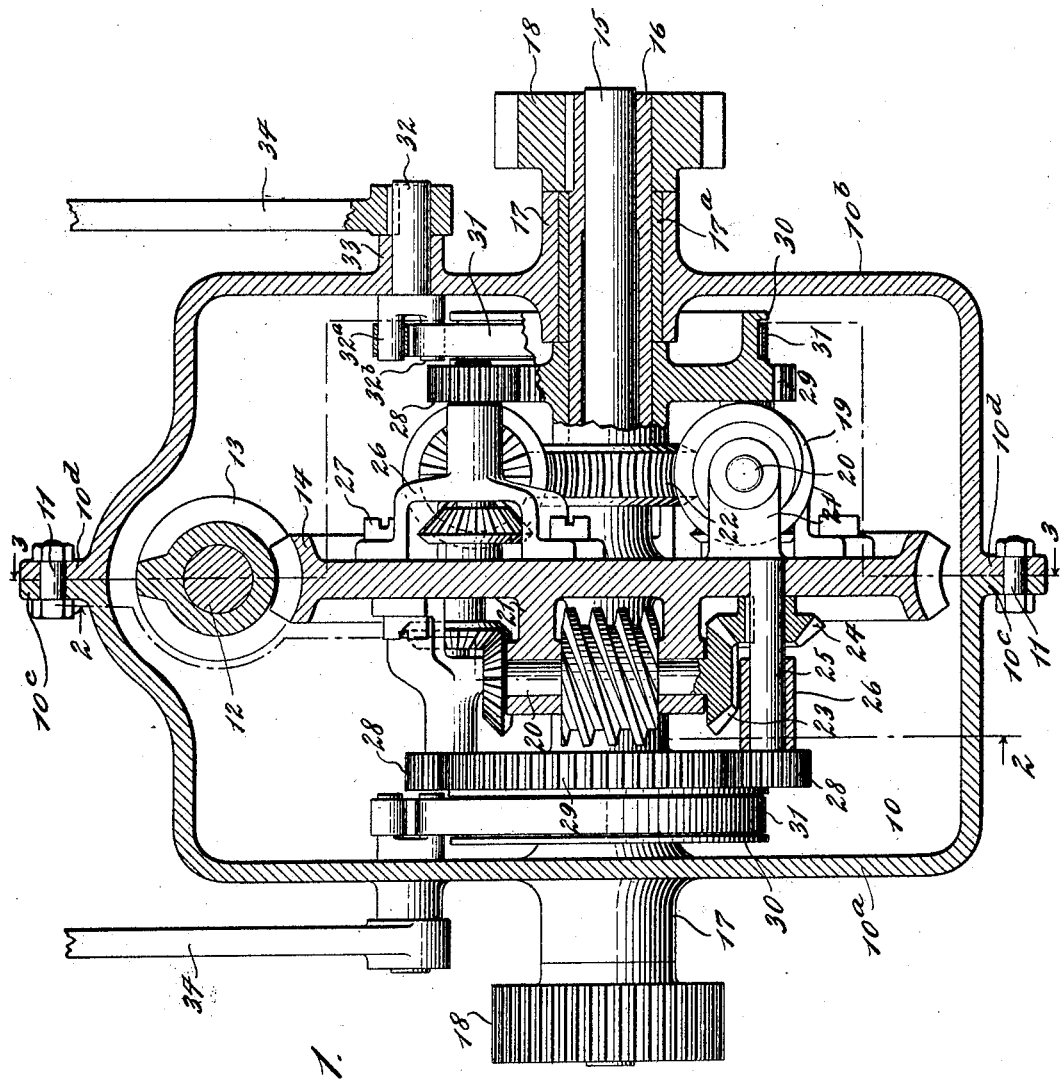
Figure 2:
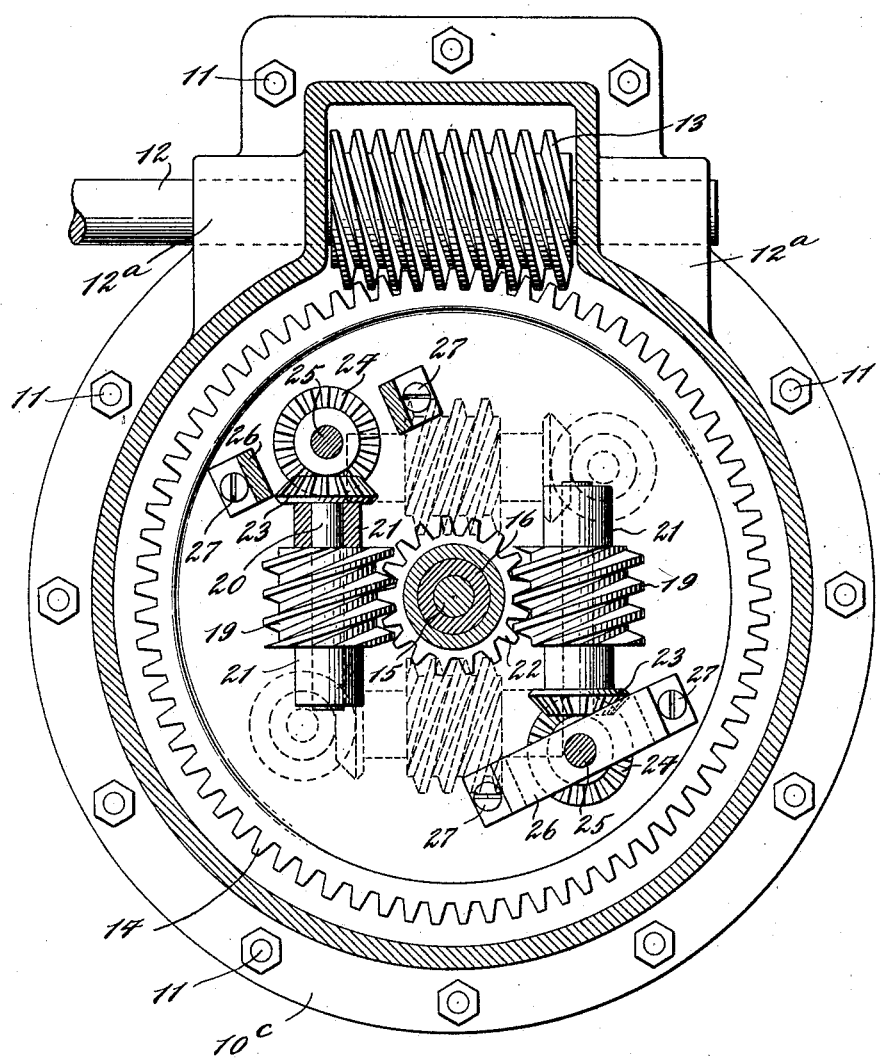
Figure 3:
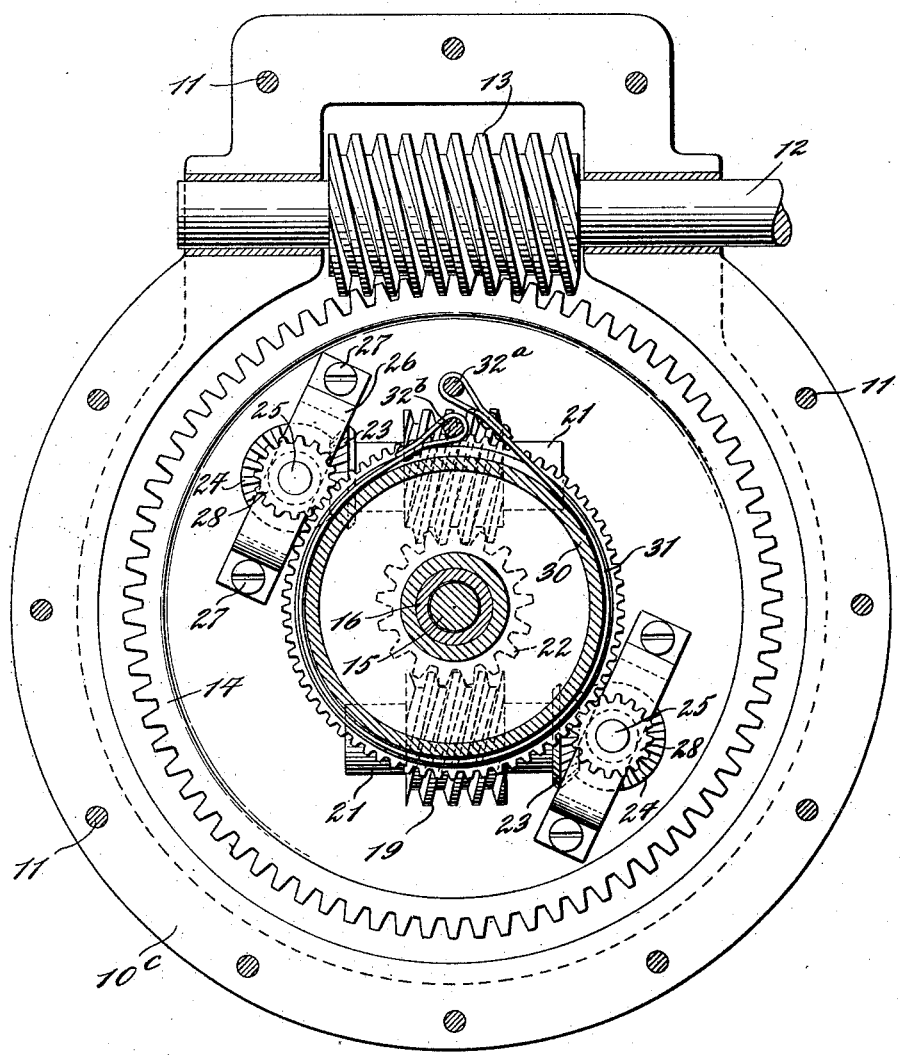

My invention will best be understood by reference to the accompanying drawings in which Figure 1 is a vertical sectional view through a power-transmitting mechanism embodying my invention; Fig. 2 is a sectional elevation taken along the line 2—2 of Fig. 1, and Fig. 3 is a sectional elevation taken along the line 3—3 of Fig. 1 and showing more particularly the brake mechanism.

Referring now to the drawings, 10 is a casing or housing within which the mechanism embodying my invention is inclosed, and is here shown as comprising two parts 10$^a$ and 10$^b$, which may be secured together by suitable bolts 11 passing through flanges 10$^c$ and 10$^d$ formed on the parts 10$^a$ and 10$^b$, respectively. The driving member 12, which is here shown as a shaft having its bearings in lugs 12$^a$ formed on the upper side of the casing 10, is connected to any suitable source of power. A worm gear 13 is secured to the shaft 12 within the housing and engages a gear wheel 14, which is secured to or made integral with a shaft 15, the latter extending through the casing in which the mechanism is inclosed. The shaft 15 is surrounded by a hollow shaft or sleeve 16, which has its bearings in a hub 17, which is here shown as integral with the casing 10, a suitable bushing 17$^a$ being interposed between the sleeve 16 and the hub. Similar sleeves 16 surround the shaft 15 at the right and at the left of the gear wheel 14, and while I shall describe the parts at one side of the gear wheel 14 only, it is to be understood that corresponding parts are to be found on the other side of the gear wheel, the two sets of parts being the same with the exception that the threads on one side are right handed while those on the other side are left handed. A driven member, which is here shown as a gear wheel 18, is secured on the sleeve 16 by means of a key or any other suitable securing means.

The connections for transmitting power from the driving gear 14 to the driven gear 18 comprise a self-locking worm 19, secured on a shaft 20, which is mounted in suitable brackets 21 secured to or made integral with the face of the gear wheel 14. The worm 19 engages a worm gear 22, which is secured to or made integral with the sleeve 16. The pitch of the worm wheel 19 is such as to give to the same a self-locking engagement with the worm gear 22, so that under normal conditions the worm gear 22 rotates at the same speed as does the gear wheel 14.

A bevel gear 23 is secured to the end of the shaft 20 without one of the brackets 21, as best shown at the left of Fig. 1. The gear 23 engages a bevel gear 24, which is secured to a shaft 25, the latter being mounted in a bracket 26, which is preferably in the form of a yoke, and which is secured to the face of the gear wheel 14 by any suitable means, such as screws 27. A pinion 28 is secured on the opposite end of the shaft 25 and engages a gear wheel 29 loosely mounted on the sleeve 16 adjacent to the hub portion 17 and within the casing. A flanged rim 30 is secured to one side or made integral with the gear wheel 29. This flange is engaged by a friction band 31, the ends of which are secured to two prongs 32$^a$ and 32$^b$ of a shaft 32, which has its bearing in a hub 33, the latter preferably being integral with the casing. The shaft 32 is operated by a suitable lever 34.

The operation of my device will readily be understood from the foregoing description and is as follows:

Under normal conditions the worm 19 is locked with the worm gear 22, so that the latter rotates with the worm 19 and has the same speed of rotation as that of the worm gear 14. Now, if it is desired to change the ratio of the speed of the driven member 18 to that of the driving gear 14, the friction band is caused to engage the friction rim 30 on the gear wheel 29 in the described manner and stops the rotation thereof. The pinion 28, which normally rotates the gear 29 on the sleeve 16, is now forced to rotate on its own axis and through the bevel gears 24 and 23, sets up a rotation of the worm 19, thereby changing the ratio of the speed of the gear 18 to that of the gear 14. In practice I prefer to reduce the speed of the gear 18 by this means, though it will be readily understood that the speed thereof may be increased, or that the rotation thereof may be stopped, or that it may be caused to rotate in the opposite direction by suitably designing the gearing.

It will be seen that I have provided independently operated means for varying the speed of each of the driven members 18. The speed of one of the driven members 18 can accordingly be changed while the speed of the other driven member 16 remains normal, or the speed of both members may be simultaneously changed.

It is to be understood that I do not limit my invention to the precise form herein described and illustrated. For example, while I have shown two self-locking gear wheels on either side of the driving gear 14, a single self-locking worm wheel could be used, or, in fact, any number could be used, though I prefer the two self-locking worm wheels, as this arrangement gives the same a balanced effect. Furthermore, I have shown a single pinion 28 engaging the gear wheel 29. It will be understood, however, that a plurality of these pinions and gears may be used in order further to vary the speed ratio of the driven member to that of the driving member.

What I claim and desire to secure by Letters Patent of the United States is:—

1. In combination, a driving member, two members driven independently by said driving member through positive connections comprising self-locking worms and gears, and means for positively rotating either worm and thereby the coöperating gear, and thereby changing the speed ratio between said driving member and the given driven member.

2. In combination, a driving member, two members driven independently by said driving member through positive connections comprising self-locking worms and gears, and power-operated means for positively rotating either pair of self-locking worms and gears and thereby changing the speed ratio between said driving member and the given driven member.

3. In combination, a driving member, two members driven independently by said driving member through positive connections comprising self-locking worms and gears, power-operated means for positively rotating either pair of self-locking worms and gears and thereby changing the speed ratio between said driving member and the given driven member, and manually-operated means for controlling said power-operated means.

4. In combination, a driving member, and two members driven independently by said driving member through positive connections comprising self-locking worm gears, and means for rotating said worm gears and thereby changing the speed ratios of said driven members to said driving member.

5. In combination, a driving member, and two members driven independently by said driving member through connections comprising self-locking worm gears, and independent means for rotating said worm gears and thereby independently changing the speed ratios of the driven members to the driving member.

6. In combination, a driving gear, two members driven thereby through connections comprising self-locking worm gears, one element of each of which rotates with the driving member, and independent means for rotating said worm gears and thereby independently changing the speed ratios of the driven members to the driving member.

7. In combination, a driving gear, two members driven thereby through connections comprising self-locking worm gears secured to either face of said driving gear, and independent means for rotating said worm gears about their own axes and thereby changing the speed ratio of said driven members to said driving member.

8. A power transmitting mechanism comprising a driving gear and a shaft secured thereto, members driven by said gear wheel comprising sleeves surrounding said shaft on either side of said gear, the driving connections comprising self-locking worm gears secured to either face of the driving gear, and independent means for rotating said worm gears about their axes, whereby the speed ratios between the driven members and the driving member are independently varied.

9. In a power transmitting mechanism, a driving gear and shaft secured thereto, a sleeve surrounding said shaft driven by said gear, a gear wheel loosely mounted on said sleeve, the driving connections between the driving gear and the sleeve comprising a self-locking worm gear, a pinion operatively connected to said worm gear and engaging the gear wheel surrounding the sleeve, and means associated with the latter gear for preventing rotation thereof whereby the worm gear is rotated about its own axis.

10. In a power transmitting mechanism, a driving gear and shaft secured thereto, a sleeve surrounding said shaft driven by said gear, a gear wheel loosely mounted on said sleeve, the driving connections between the driving gear and the sleeve comprising a self-locking worm gear, a pinion operatively connected to said worm gear and engaging the gear wheel surrounding the sleeve, and means comprising a friction band for preventing rotation of said latter gear.

In testimony whereof I have hereunto signed my name in the presence of two subscribing witnesses.

NORMAN C. STOREY.

Witnesses:
 DANN L. WOOD,
 JOHN T. CLARK.